United States Patent [19]
Seymour et al.

[11] Patent Number: 6,092,745
[45] Date of Patent: Jul. 25, 2000

[54] SITE-SPECIFIC CONTROL SYSTEM FOR MANURE SPREADER

[75] Inventors: Shaun A. Seymour, New Holland; Linwood H. Bowen, Lancaster; Carl E. Bohman, New Holland; John H. Posselius, Ephrata, all of Pa.

[73] Assignee: New Holland North America, Inc., New Holland, Pa.

[21] Appl. No.: 09/160,138

[22] Filed: Sep. 25, 1998

Related U.S. Application Data

[63] Continuation-in-part of application No. 08/895,068, Jul. 16, 1997.

[51] Int. Cl.$^7$ ............................................. A01C 19/00
[52] U.S. Cl. ........................... 239/675; 239/63; 239/67; 239/69; 239/673; 239/680; 239/684
[58] Field of Search ........................... 239/63, 67, 69, 239/650, 661, 665, 668, 670, 672, 673, 675, 677, 679, 680, 681, 682, 684, 687, 101

[56] References Cited

U.S. PATENT DOCUMENTS

| | | | |
|---|---|---|---|
| 3,679,098 | 7/1972 | Weiss | 239/677 X |
| 4,277,022 | 7/1981 | Holdsworth et al. | 239/677 X |
| 4,523,280 | 6/1985 | Bachman | 239/74 X |
| 5,096,125 | 3/1992 | Wise et al. | 239/675 |
| 5,186,396 | 2/1993 | Wise et al. | 239/677 X |
| 5,199,638 | 4/1993 | Fischer | 239/675 X |
| 5,220,876 | 6/1993 | Monson et al. | 239/63 X |
| 5,386,943 | 2/1995 | Peeters | 239/675 |
| 5,435,494 | 7/1995 | Knight et al. | 239/675 |
| 5,501,404 | 3/1996 | Meyer et al. | 239/682 X |
| 5,904,296 | 5/1999 | Doherty et al. | 239/69 X |

*Primary Examiner*—Andres Kashnikow
*Assistant Examiner*—Robin O. Evans
*Attorney, Agent, or Firm*—Griffin & Szipl, P.C.

[57] ABSTRACT

A material spreader comprising a mobile tank for receiving and discharging waste material, such as manure. The spreader includes a conveying assembly comprising one or more augers rotatably mounted in the tank for conveying material received in the tank to a discharge area. An opening in the vicinity of the discharge area permits material to be dispensed to a slinger assembly mounted outside the tank adjacent the opening. Material is distributed by the slinger in a controlled pattern as the tank is transported over a field. A control system is provided for selectively controlling the rate and pattern of the material being distributed, based on characteristics of the material. A field is divided into cells and data relating to the nutrient demand of each cell is collected and stored in tables in a memory. A GPS receiver detects the location of the spreader as it moves over a field. Nutrient demand data, specific to the cell in which the spreader is located, is the read from the memory to control the rate at which nutrient material is dispersed from the spreader.

24 Claims, 9 Drawing Sheets

SITE-SPECIFIC CONTROL SYSTEM FOR MANURE SPREADER

RELATED APPLICATIONS

This application is a continuation in part of application Ser. No. 08/895,068 filed Jul. 16, 1997.

FIELD OF THE INVENTION

The present invention relates generally to manure spreaders and more particularly to open and closed loop control systems for controlling the distribution of soil nutrient material being discharged from a manure spreader as the spreader traverses a field. Input data defining the amount of nutrient material to be applied to the field may be entered by an operator or it may be obtained from stored data previously accumulated and accessed according to the location of the spreader as determined by a Global Position System.

BACKGROUND OF THE INVENTION

Various mobile equipment exists for dispensing a wide range of fertilizers onto lawns, gardens and fields. Of particular interest with respect to the present application is fertilizer spreading apparatus of the type commonly referred to as a manure spreader, which as its name implies, is typically used to spread animal wastes, such as barnyard manure. In a typical farm operation, manure is hauled from a confined holding area and dispensed as fertilizer onto fields where crops are to be grown. To this end, a variety of manure spreaders have been developed over the years to haul and distribute different types of manure. For instance, conventional box spreaders are preferred for handling dry, clumpy types of manure.

Box spreaders, well known in the agricultural implement art, include a box-like holding container in which a moveable conveyor is mounted in the bottom for transferring the material to the rear of the box. Rotating beaters, typically paddle shaped, are mounted in a transverse fashion at the rear of the box to engage and break up the material that has been conveyed rearwardly. The paddles also serve to distribute the broken up material in a swath as the spreader is transported across the field.

Even though box spreaders have proven to be effective for handling dry, clumpy manure, they have not been as effective for distributing manure that has a significant liquid content. One problem is that box spreaders are not sealed, resulting in leakage of the liquid content of the manure as it is being transported to the field, which in many instances is over publicly traveled roadways. To overcome this and other problems encountered with respect to the handling of liquid and semi-liquid manure, spreaders have been developed having V-shaped tanks with inwardly angled sides for conveying the material to auger assemblies mounted in the tank bottom, which in turn convey the material to distribution means. This type of spreader, as opposed to a box spreader, is commonly referred to as a tank spreader and is well adapted for handling cattle manure in liquid or slurry form as well as various types of dry manure, such as swine and poultry manure. U.S. Pat. No. 5,221,049, issued Jun. 22, 1993 in the name of Gilbert W. Linde et al, shows a tank spreader. In this spreader a distribution assembly expels material out of the side of the tank.

Tank type spreaders have been found to be particularly adaptable in precision farming operations where it is highly desirable to uniformly discharge and distribute manure to achieve specified coverage. Although it has always been desirable for nutrients provided by manure to be applied to areas in a field where it has been determined that such nutrients or other attributes are needed, it has only been recently that advances in technology have made it possible to expeditiously and accurately identify these areas in such field. For example, it is now possible to pinpoint critical field locations using precise data acquired via a satellite based Geographic Information System (GIS). Having identified such locations, problems are still encountered in manually controlling the discharge of material from tank spreaders to consistently achieve reliable results. Distribution systems based on operator judgement in many instances lack the accuracy needed to properly fulfill the demanding goals of precision farming.

In one common system using a tank spreader of the type shown in U.S. Pat. No. 5,501,404, issued Mar. 26, 1995 in the name of Donald A. Meyer et al, the manure or other nutrient material to be spread is initially loaded into a mobile tank and transported to the field having known nutrient deficiencies. The spreader travels over the field while its auger delivers the material to a generally horizontal slinger for distribution of the material onto the field. The width of distribution is set by the speed imparted to the material by the slingers, whereupon material coverage is determined primarily by the rotational speed of the auger along with the ground speed of the spreader. To a lesser degree the type, consistency and density of the material being distributed also affect the coverage and distribution pattern. Thus, the operator must first ascertain characteristics of the material and then coordinate ground and auger speeds selectively during operation, based on experience and knowledge of the equipment. It is acknowledged that human error along with other inherent limitations give rise to problems in a system of this nature.

U.S. Pat. No. 4,277,022 discloses a spreader for spreading sand, salt, manure or other particulate material, the spreader having a closed loop controller. In this device a continuous measurement of the actual mass flow rate is compared to a desired mass flow rate. The vehicle speed is measured and used to modify the desired rate of mass flow.

SUMMARY OF THE INVENTION

An object of the present invention is to provide a spreader for accurately dispersing nutrient material onto a field at a desired rate.

Another object of the invention is to provide a control system for a nutrient spreader, the control system having sensors producing output signals from which the actual weight of nutrient material dispersed per unit area of a field may be determined and compared to a desired weight per unit area, the difference being utilized to modify the speed of a conveyor which delivers the material to a dispersal region. In one embodiment sensors sense the weight of a tank and the nutrient material therein. In a second embodiment a sensor senses the weight of nutrient material on a slinger which disperses the material. In a third embodiment the torque required to rotate the slinger is sensed. In all embodiments a sensor senses the speed of the spreader.

A further object of the invention is to provide a control system for a tank spreader in which the system makes on-the-go corrections to accommodate changes in the vehicle speed, variations in material density, and the need for nutrients at the point of application.

An important aspect of the invention is the provision of a memory storing tables of nutrient demand data, one table for each type of nutrient material which might be spread. Each table holds therein a value representing, for each cell or region of a field, the optimum weight of nutrient material which should be dispersed per unit area. A GPS receiver carried on the spreader determines in which cell of the field the spreader is currently located, and accesses the memory to read out the nutrient demand value for that cell. The nutrient demand value then controls a conveyor drive motor so that nutrient material is delivered to a slinger an dispersed at the weight per unit area specified by the nutrient demand value. Thus, as the spreader moves over a field from one cell to the next it automatically adjusts the dispersal rate according to the nutrient needs of the soil.

The foregoing and other objects, features and advantages of the invention will appear more fully hereinafter from a consideration of the following detailed description and the accompanying drawings wherein a preferred embodiment of the invention is illustrated by way of example. It is to be expressly understood, however, that the drawings are for illustrative purposes and are not to be construed as defining the limits of the invention.

DESCRIPTION OF THE INVENTION

Figure 1:
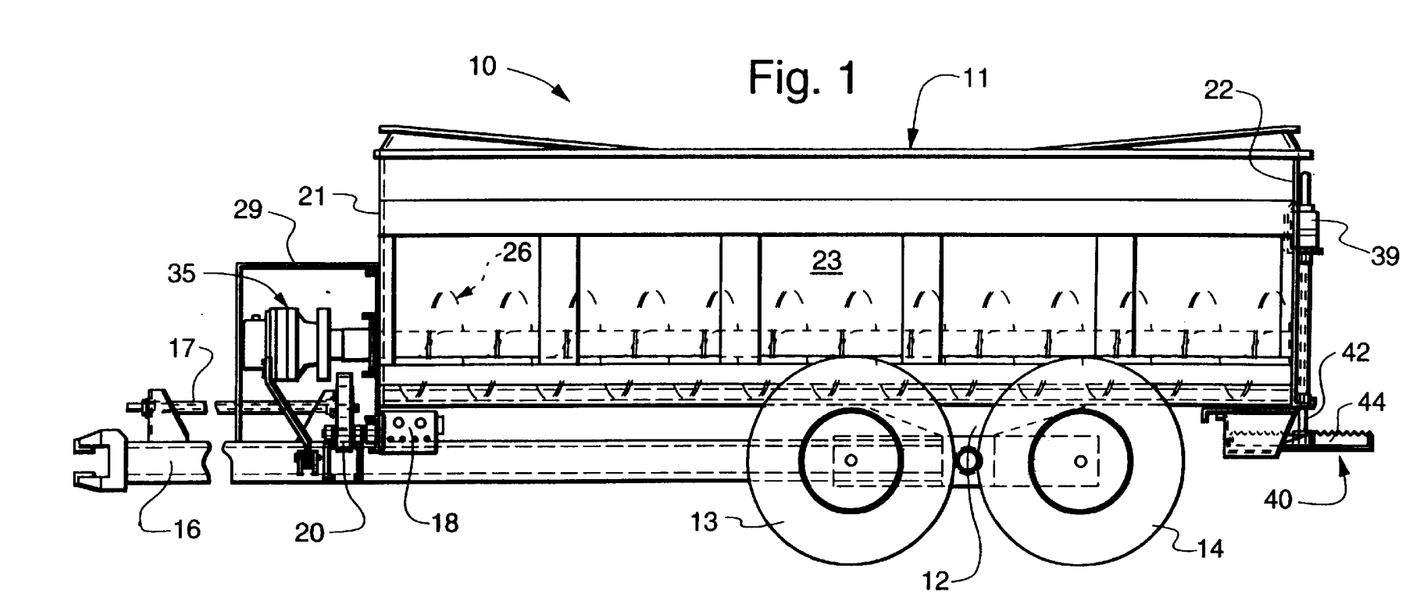
FIG. 1 is a side elevation view of one type of manure spreader on which the system of the present invention may be implemented.
Figure 2:
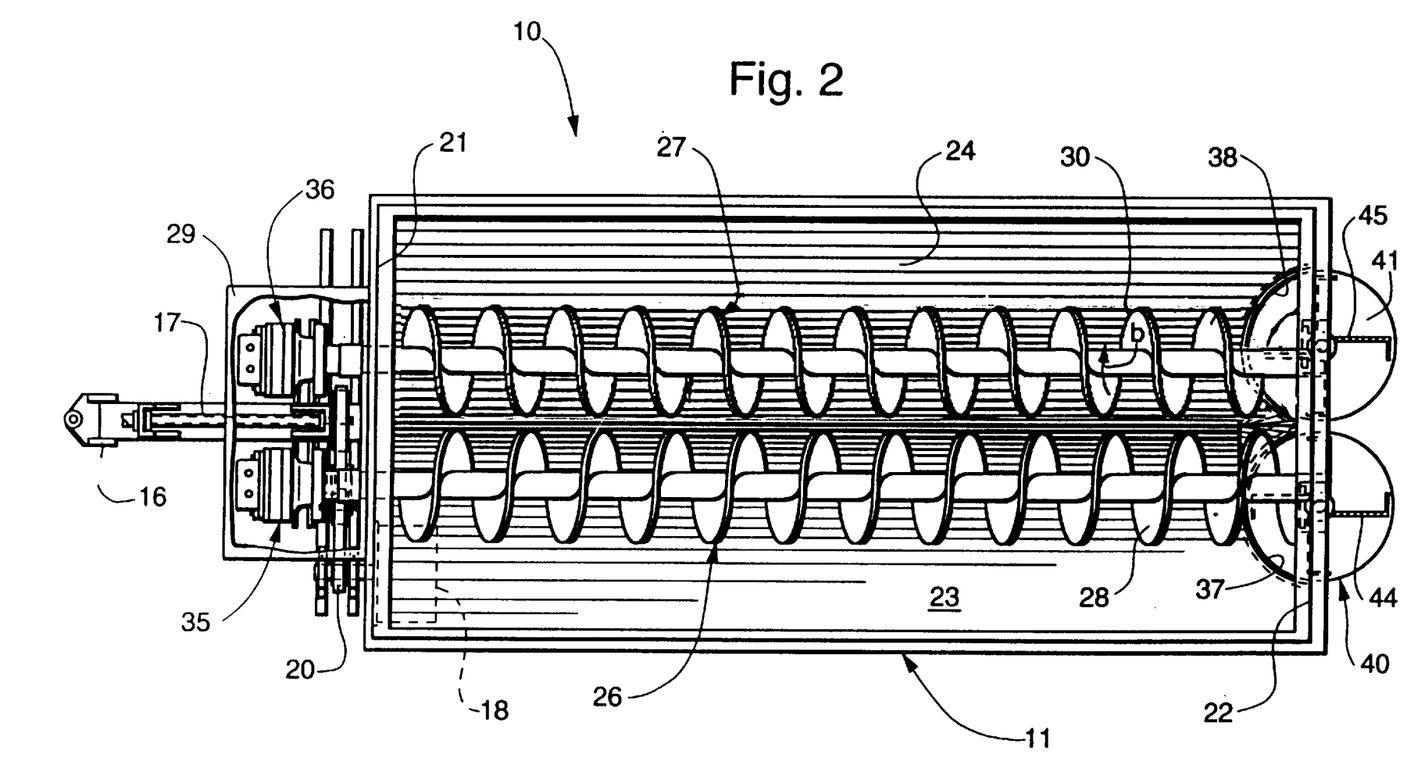
FIG. 2 is a top view of the manure spreader shown in FIG. 1.
Figure 3:
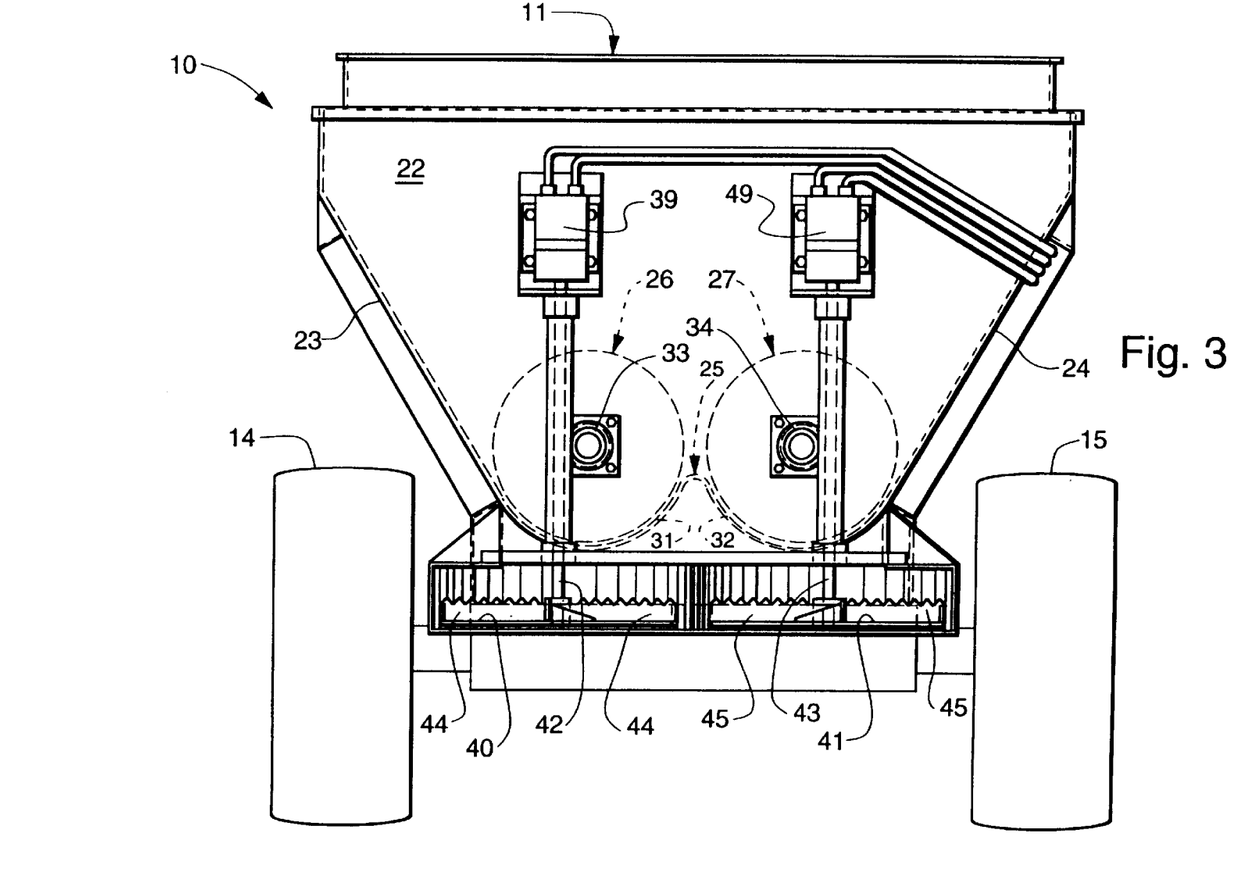
FIG. 3 is a view, taken from the right end of the manure spreader shown in FIGS. 1 and 2.

Referring now to the drawings for a more detailed description of the present invention, FIGS. 1, 2 and 3 show the side, top and end views of a manure spreader, generally designated by reference numeral 10, on which the elements of the preferred embodiment of the present invention may be readily carried out. Spreader 10 includes a tank 11 mounted on a frame 12 supported by a pair of tandem ground-engaging wheels 13, 14 on the left side, shown in FIG. 1, and a like pair of tandemly mounted ground engaging wheels 15 (only one shown in FIG. 3) on the right side. A towing vehicle, such as a tractor, is hitched in towing and driving engagement with the spreader via a tongue 16 connected to the tractor and a drive shaft 17 coupled to the PTO of the tractor. Rotative force from shaft 17 is coupled to hydraulic pump 18 via a drive belt 20.

Tank 11 comprises front wall 21, rear wall 22, a pair of inclined side walls 23, 24, and a bottom 25 (FIG. 3) comprising a pair of side-by-side, adjacent, arcuate troughs 31, 32 separated by an intermediate interconnecting area. Mounted within the troughs are a pair of augers 26, 27 having flighting 28, 30 with a circular projection that is accommodated by the radius of the arcuate troughs 31, 32, respectively. The augers, mounted in bearing assemblies 33, 34 affixed to rear wall 22, are driven by a pair of hydraulic motors 35, 36 operatively coupled to pump 18 in a conventional manner. Housing 29 is broken away in FIG. 2 to show motors 35, 36 mounted therein drivingly coupled to rotate flighting 28, 30 in a direction that urges material in the bottom of tank 11 in a rearward direction.

A discharge area in the rear bottom vicinity of tank 11 includes arcuate openings 37, 38 in the tank bottom 35. The openings are at the rear most part of troughs 31, 32 and manually operable gates (not shown) may be provided for limiting low 9 consistency material flow from the tank. Directly below the openings are circular slinger assemblies 40, 41, mounted for rotation with shafts 42, 43 which extend downwardly from hydraulic motors 39, 49 secured to back wall 22 of tank 11. A plurality of material engaging fins 44, 45 extend upwardly from slingers 40, 41, respectively for engaging material discharged from the tank through openings 37, 38. The number and shape of the fins on the slingers is varied to accommodate the material and desired 3D spread pattern of the material as it is being distributed from spreader 10 during traversal of the field on which it is being operated.

Figure 4:
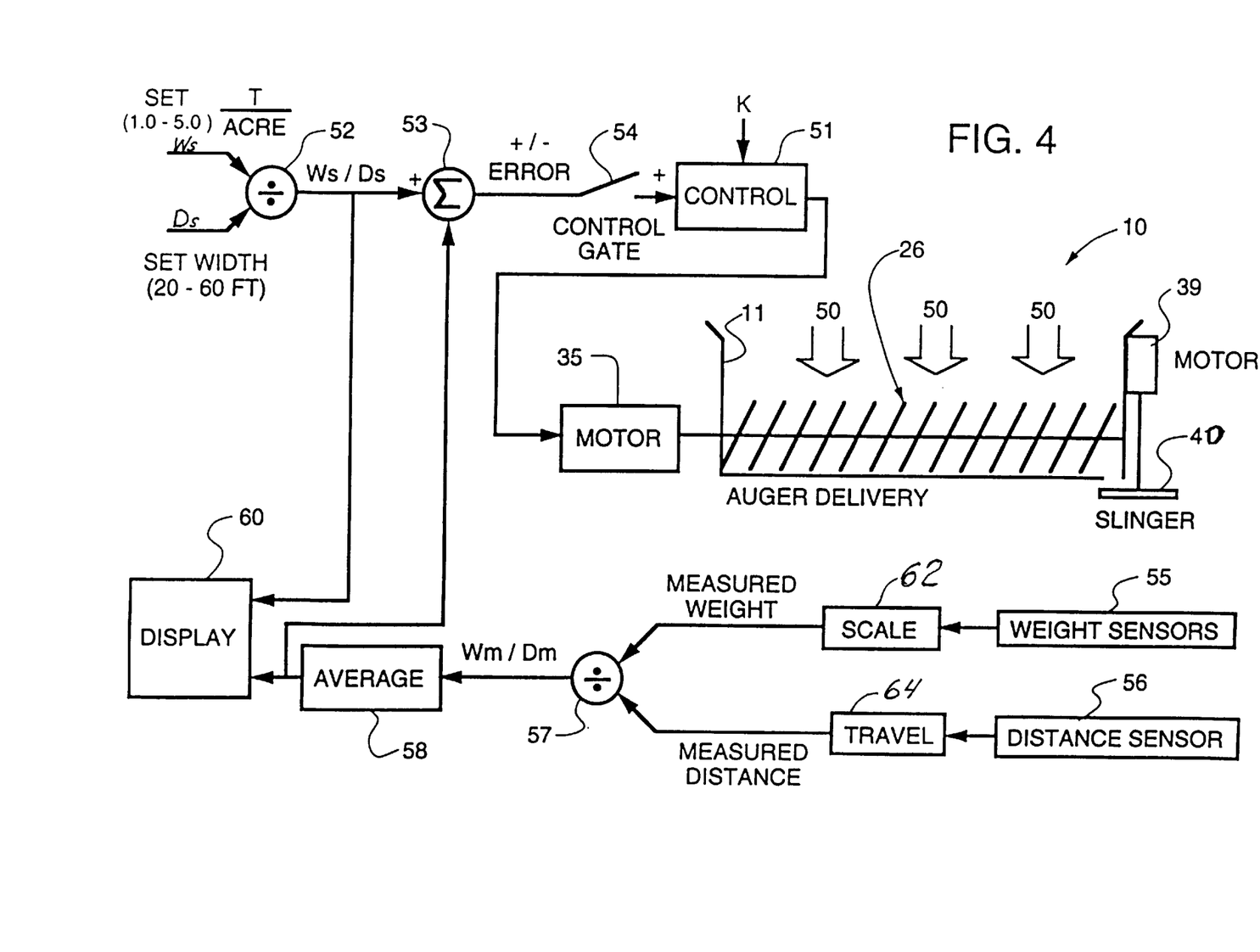
FIG. 4 is a schematic diagram functionally illustrating the algorithm carried out by a first embodiment of a closed loop spreader control system wherein the weight of nutrient material in the spreader tank is periodically sampled to determine the rate of application of the material, and the operator enters nutrient demand data via a control panel.

FIG. 4 functionally illustrates a first embodiment of a closed loop spreader control system according to the invention. In this embodiment the rotational speed of augers 26,27 is controlled according to the weight of the nutrient material dispersed over a measuring interval and the distance traveled by the spreader during that interval. FIG. 4 shows only the one drive motor 35, the one auger assembly 26, and the one slinger 40 to simplify the description, it being understood that the spreader 10 preferably has a second drive motor 36, a second auger assembly 27 and a second slinger 41 as shown in FIG. 2. The control system is adaptable to control either single or double auger spreaders and has been operated successfully with a double auger spreader as described above.

Auger assembly 26 is mounted in the bottom of tank 11 for delivering material to a discharge area above slinger assembly 40 which is being rotated by motor 39. During operation, manure or other nutrient material is loaded into tank 11 and fed downwardly by gravity to auger assembly 26 as depicted by flow arrows 50. The auger assembly 26, driven by motor 35, urges the material rearwardly in a manner consistent with common functional aspects of an auger assembly. When the material is discharged from tank 11 it is engaged by fins 44 (FIG. 3) on slinger 40 for distribution over a transverse area determined by the nature of the material and the size, structure and speed of the slinger. Concurrently, auger assembly 27 (FIG. 2) is driven by motor 36 to discharge material which is distributed by fins 45 on slinger 41 driven by motor 49.

Initially, the operator enters a value which is applied to a control circuit (not shown) to set the speed or rate of rotation of the slinger drive motors 39,49 and thus the width (usually 20 to 60 feet) of a path over which the nutrient material is to be spread. This value is entered via a control panel 68 (FIG. 4A) which may comprise a conventional keyboard, potentiometer control knobs or a combination of both.

Next, the operator enters a selected rate K into a control circuit 51. The rate K sets the initial rate of rotation of the auger drive motors 35,36 and is selected based on past experience of the operator in spreading materials having characteristics similar to those of the material about to be spread. The output signal from control circuit 51 controls a variable displacement pump 61 (FIG. 4A) which in turn drives motors 35,36 so that augers 26,27 convey material for discharge by slingers 40,41 at a set rate determined by past experience of the operator when handling material having characteristics like, or similar to, the characteristics of the material to be spread.

The operator then enters two values Ws and Ds which are applied to a computation circuit 52. Ws corresponds to what past experience has shown to be an optimum amount or weight of nutrient material to be dispensed per unit of area (usually in the range of 1.0 to 5.0 tons per acre) in order to meet the nutrient demands of the region of a field about to be covered. The value Ds specifies the measured width of the path over which the slinger drive motors 39,49 actually distribute the material as the spreader moves over a field. It should be noted that in a test environment the setting of the slinger motor speed and entry of the value Ds were arranged as separate operations. However, in a more practical embodiment the signal representing the value Ds may be applied to both computation circuit 52 and the slinger drive motors.

The computation circuit 52 includes a divider which divides Ws by Ds to obtain the value Ws/Ds representing the desired rate of application of the nutrient material, that is, the weight of nutrient material to be dispensed for each unit of forward movement of the spreader. The value Ws/Ds is applied to a comparator 53 where it is compared with a signal Wm/Dm, derived as next described and representing the real time measured rate of dispersal of the material.

Spreader 10 is provided with weight sensors 55 which measure the weight of nutrient material remaining in tank 11 and a distance sensor 56 measures the distance traveled by the spreader as the material is being spread. The weight measurement sensor may be a standard mobile scale system such as a strain gauge arrangement on the wheel hubs and hitch point, similar to those used on grinder mixers. The weight sensors merely provide an indication of the weight of the tank 11 and its contents at any given instant. To obtain the weight of dispersed material, the sensor outputs are periodically sampled by a timing or sequence control circuit (not shown). As shown in the timing diagram of FIG. 5, this sampling may occur on the order of three times per second. Each sample value is saved and subtracted from the immediately preceding sample in a scale circuit 62. The output of circuit 62 is thus a signal Wm indicating the measured weight of the nutrient material dispersed during the preceding ⅓ sec. interval. Signal Wm is applied to one input of a divider 57.

Figure 5:
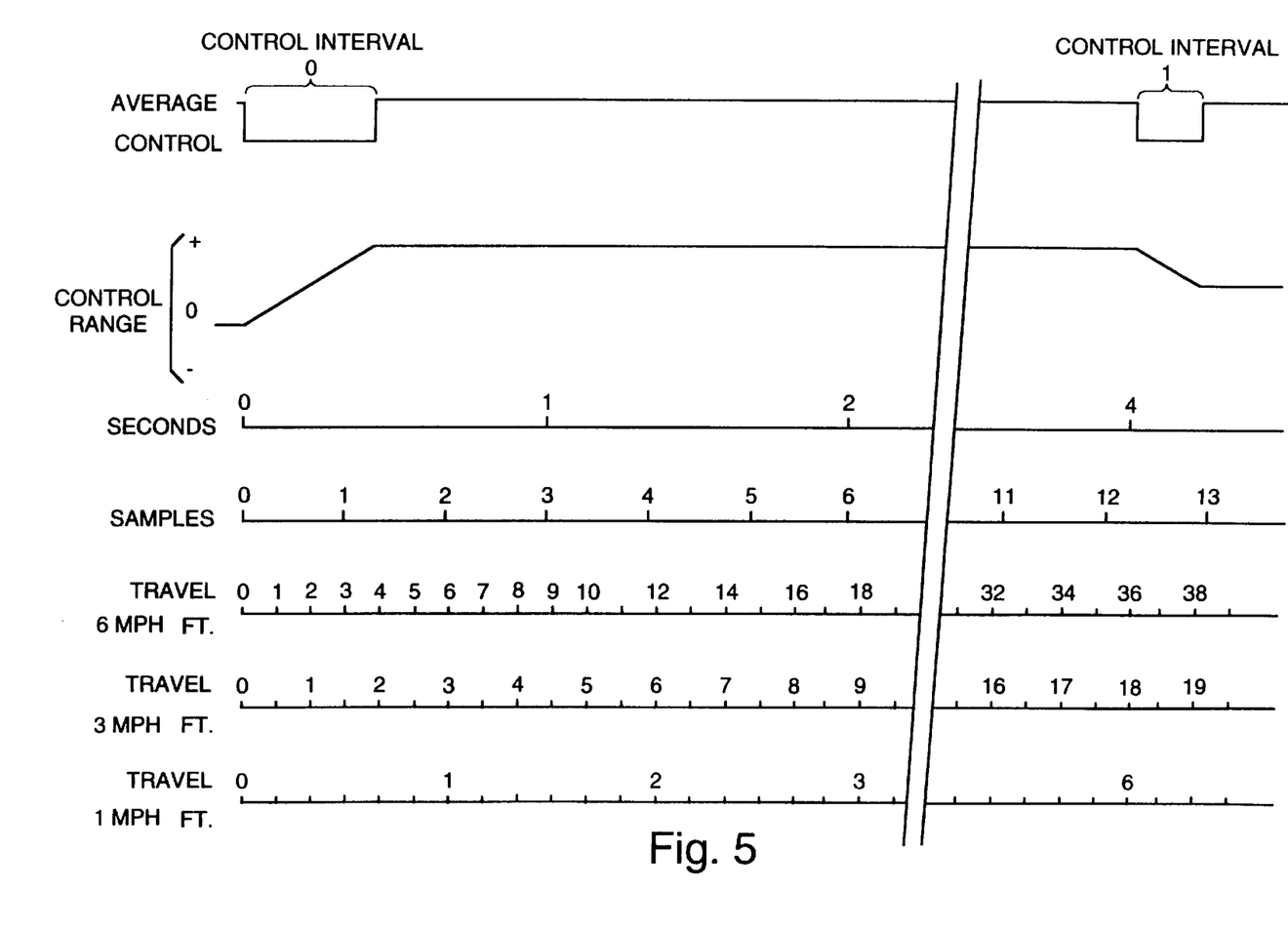
FIG. 5 is a timing diagram illustrating the sequence of operation of the control system of FIG. 4A.

Distance sensor 56 may be any distance measurement device such as a wheel sensor, or a radar or ultrasonic speed sensor with circuitry for measuring the passage of time and multiplying the speed by the elapsed time. The output of distance sensor 56 is sampled concurrently with the sampling of the weight sensor output signals. Each sample value is saved and subtracted from the preceding sample in a travel circuit 64. The output of circuit 64 is thus a signal Dm indicating the measured distance traveled by the spreader during the preceding ⅓ sec. FIG. 5 illustrates the number of feet of forward travel during the interval between samples when the spreader speed is 1, 3 and 6 mph.

Dm is also applied to divider 57 which divides the measured weight signal Wm by the measured distance signal to produce the value Wm/Dm representing the measured weight of nutrient material dispersed onto the field over a distance traveled by the spreader in the last ⅓ sec. Wm/Dm is applied to an averaging circuit 58 which averages Wm/Dm over a preselected interval of time which, in the case illustrated in FIG. 5, is 4 seconds.

The measured ratio Wm/Dm is applied to comparator 53 which compares the measured ratio Wm/Dm with the desired or set ratio Ws/Ds. Comparator 53 produces a bi-polar error signal representing the difference between the desired rate of dispersal of the nutrient material and the actual rate of dispersal. The error signal is applied to control circuit 51 via a control gate 54 which is closed periodically by the sequence controller and remains closed for an interval of time proportional to the magnitude of the error signal. During the control interval, circuit 51 ramps up or down the magnitude of the energizing signal it applies to the variable displacement pump driving motors 35,36. If the error signal indicates that the measured rate of material dispersal is less than the desired rate of dispersal (Wm/Dm<Ws/Ds) the rotational speed of motors 35,36 is increased to thereby increase the rate at which material is delivered to the slingers. On the other hand, if the error signal indicates that the measured rate of material dispersal is greater than the desired rate of dispersal (Wm/Dm>Ws/Ds) the output of the variable displacement pump 61 driving motors 35,36 is decreased to thereby decrease the rate at which material is delivered to the slingers.

The embodiment shown in FIG. 4 thus dynamically controls the rate of discharge of material from the tank 11 to an operator-selected rate, the control being obtained via a closed loop having as inputs the distance traveled by the spreader over an interval of time and the weight of the material dispersed during that interval.

A display 60 may be provided for visually indicating to the operator the magnitudes of the signals Ws/Ds and Wm/Dm. This display may take the form of side-by-side bar displays. Display 60 is preferably disposed near the control panel by means of which the operator enters data into the system, and may display other information such as the set tonnage per acre, the set distribution width, status of the control gate, auger and slinger motor rpms, etc.

Figure 4A:
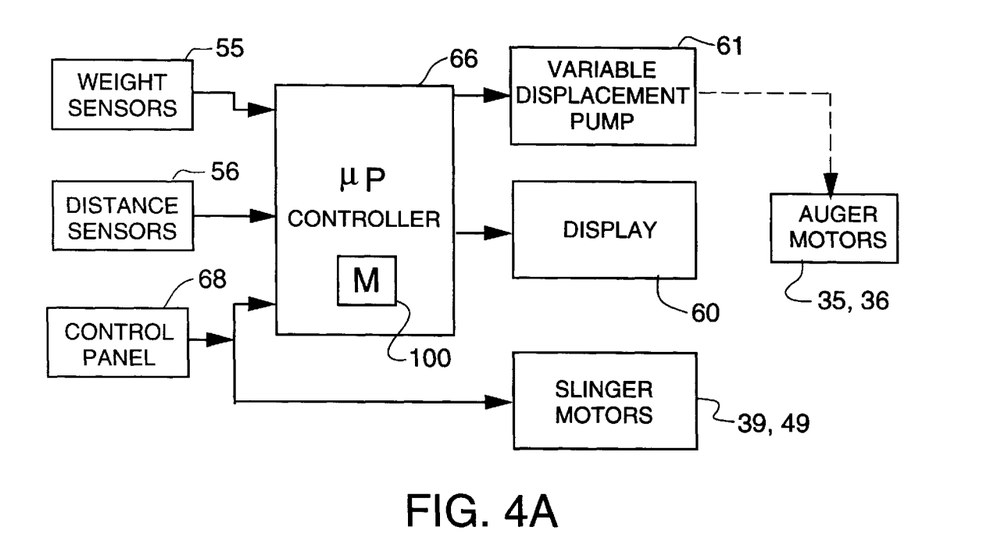
FIG. 4A is a block diagram of a microprocessor-based digital control system implementing the algorithm of FIG. 4.

The spreader control system may be implemented with analog circuits or digital circuits. In the latter case the system may comprise a controller in the form of a conventional microprocessor 66 as shown in FIG. 4A. The microprocessor is programmed to carry out the operations of elements 51–54, 57, 58, 62 and 64. The microprocessor includes an analog-to-digital converter (not shown) if the input signals Ws and Ds are analog signals or the weight and/or distance sensors are of a type producing an analog output signal. In FIG. 4A, the operator control panel 68 may comprise a conventional keyboard and/or variable potentiometers for inputting the signals Ws, Ds and K.

In the embodiment of FIGS. 4 and 4A, the operator, from past experience, selects the value Ws which determines the amount of nutrient material to be applied over a field. If the operator is inexperienced he may set Ws so that too much or not enough material is applied. If too much material is applied, resources are wasted and rivers and streams may be unduly polluted by run-off during rains. On the other hand, if too little material is applied the crop yield will be low. Also, the optimum amount of material to be applied may vary from one location to another over the field, making it difficult if not impossible for the operator to select the optimum value of Ws for each location.

Figure 6:
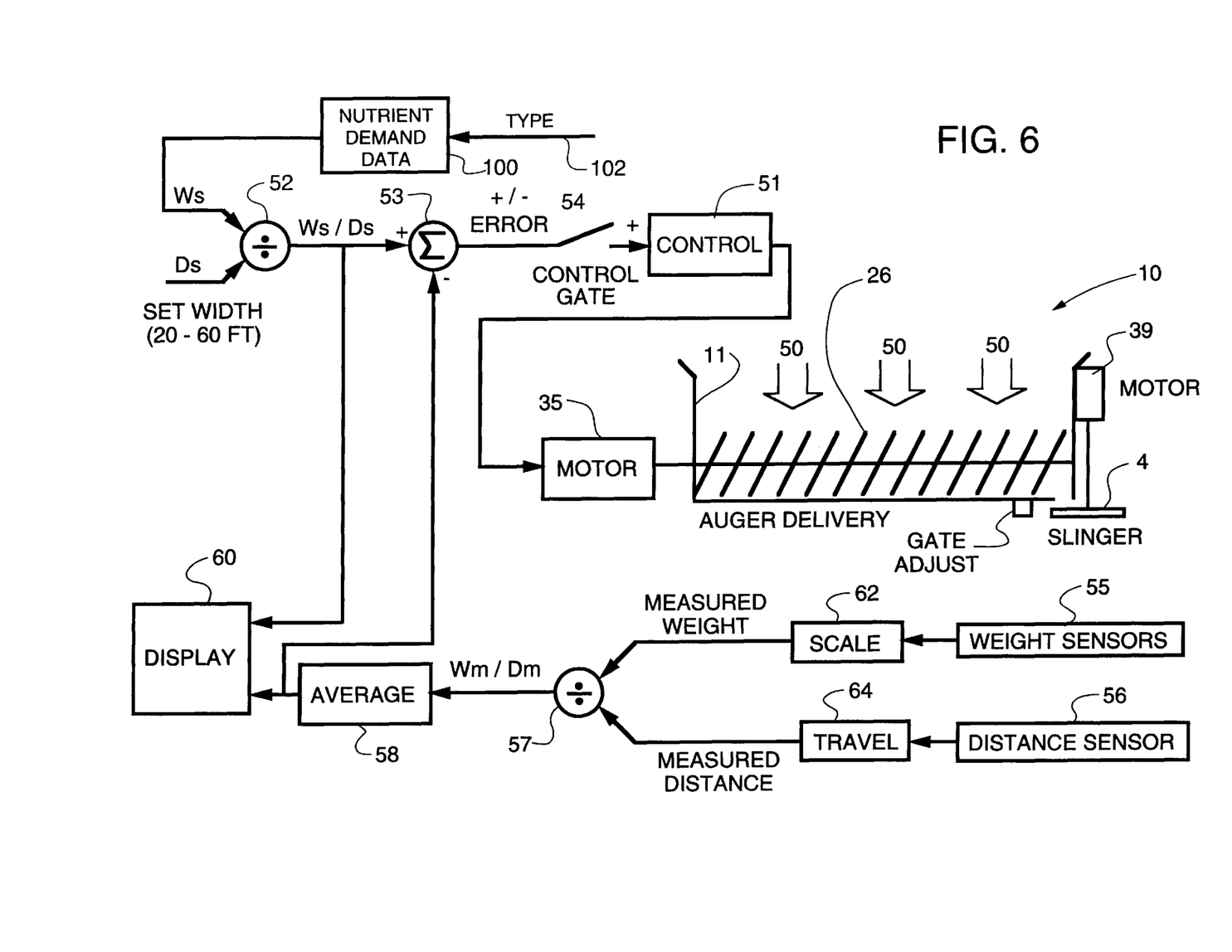
FIG. 6 is a schematic diagram functionally illustrating a spreader control system wherein previously collected nutrient demand data is stored, the stored data being accessed according to the location of the spreader in a field to control the rate of application of nutrient material.

FIG. 6 functionally illustrates an embodiment of the invention which overcomes these difficulties by removing from the operator the burden of selecting the weight Ws of the material to be dispersed per unit of area. In FIG. 6, the system is provided with a memory or data storage means 100 which stores tables of site-specific data relating to the nutrient needs of a field. This data may be gathered by dividing a field into a plurality of sites or cells and then sampling and analyzing the soil in each cell to determine the nutrient need of each cell. A conventional satellite based Geographic Information System (GIS) may be used to determine the nutrient need of each cell. Based on the collected information, tables of nutrient demand data are created, one table for each type of nutrient material which may be applied. Each table contains, for each cell, a value Ws representing the optimum weight of a particular nutrient which should be applied to that cell. At the beginning of a spreading operation the operator selects, via the control panel 68, the type of nutrient material to be spread. This selects, via connection 102, one table of nutrient demand data to be accessed during the ensuing spreading operation.

The spreader is provided with a conventional Global Position System (GPS) receiver 104 (FIG. 6A) which produces an output signal representing the current position of the spreader as it moves over a field. As the spreader moves over a field the current position signal is used to address the selected table to read out the value Ws for the cell in which the spreader is currently located. The signal Ws is applied to the computation circuit 52. The control system shown in FIG. 6 then functions in the same way as the control system of FIG. 4A. It is not necessary for the operator to enter a value K at start-up to initially set the speed of the auger drive motors because the value Ws from memory 100, acting through comparator 53, will cause the auger motor drive signal from control circuit 51 to rise to the optimum level within a fraction of a second.

Figure 6A:
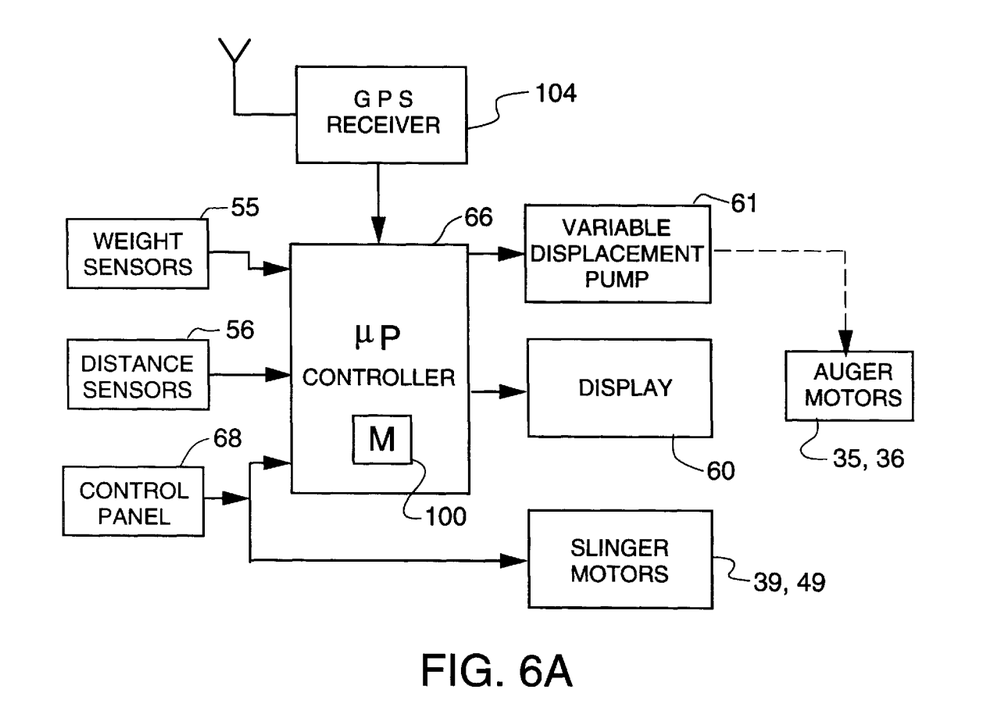
FIG. 6A is a block diagram of a microprocessor-based digital control system implementing the algorithm of FIG. 6.

Because of the need for data storage, the system employing site-specific data is best implemented with digital circuits including a microprocessor 66' as shown in FIG. 6A. The cell size and the area of the field determine how much storage is required. One dimension of a cell should be no less than the minimum width over which the spreader is capable of spreading the material. Neither dimension of a cell may be less than the resolution of the Global Position System used to determine the position of the spreader on the field. Global Position Systems currently in use are capable of locating the spreader position with an error of no more than 1 meter.

The microprocessor is programmed to execute the algorithm functionally represented in FIG. 6. In addition, the microprocessor is programmed to sense the GPS receiver output and read the value Ws for the current spreader position from memory 100 periodically at short intervals of a few milliseconds.

The nutrient demand signal Ws available at the output of memory 100 depends on the type of material selected. For example, the value of the signal Ws available at the output of memory 100 will be one value if poultry manure is selected, a second value if swine manure is selected, and so forth. The signal Ws represents the weight of the material to be applied per unit area assuming maximum nutrient value. It does not take into account the variations in nutrient value per unit weight of a given material because of variations in its density and consistency. For example, a given weight of a low consistency slurry of nutrient material of any type will have less nutrient value than the same weight of a higher consistency slurry. Since the ultimate object is to provide the optimum amount of nutrients to the soil, rather than a given weight of the nutrient material, the signal Ws should be modified to take into account its nutrient value per unit weight. In FIG. 6A, factors having values less than one and defining the density and consistency of the material, are entered into the system via the control panel 68. In FIG. 6 these factors are applied to computation circuit 52 to modify (reduce) the value of either Ws or the ratio Ws/Ds. Therefore, the resulting ratio Ws/Ds represents the optimum weight of the material to be applied per unit area of the field, taking into account the nutrient value of the material per unit weight. Enough nutrients are applied to the field to satisfy its nutrient requirements without excessive fertilizing. As a result, natural resources are conserved and productivity of the land is increased, the direct consequence of which should lead to a reduction in food prices as well as a reduction in the amount of nutrient material finding its way into rivers and streams. Thus, this aspect of the invention facilitates compliance with environmental restrictions imposed by government agencies to protect and improve the quality of ground water and water supplies in general.

The embodiments of FIGS. 4 and 6 measure the weight of the tank 11 and its contents to develop the feedback signal indicating how much material is actually dispersed per unit of distance traveled. Other embodiments are possible as functionally depicted in FIGS. 7–9. The embodiments shown in FIGS. 7–9 may be implemented in a microprocessor based control circuit as shown in either FIG. 4A or FIG. 6A, that is, in a system wherein the operator enters the nutrient demand data or a system wherein stored site-specific nutrient demand data is automatically accessed according to the location of the spreader on a field.

Figure 7:
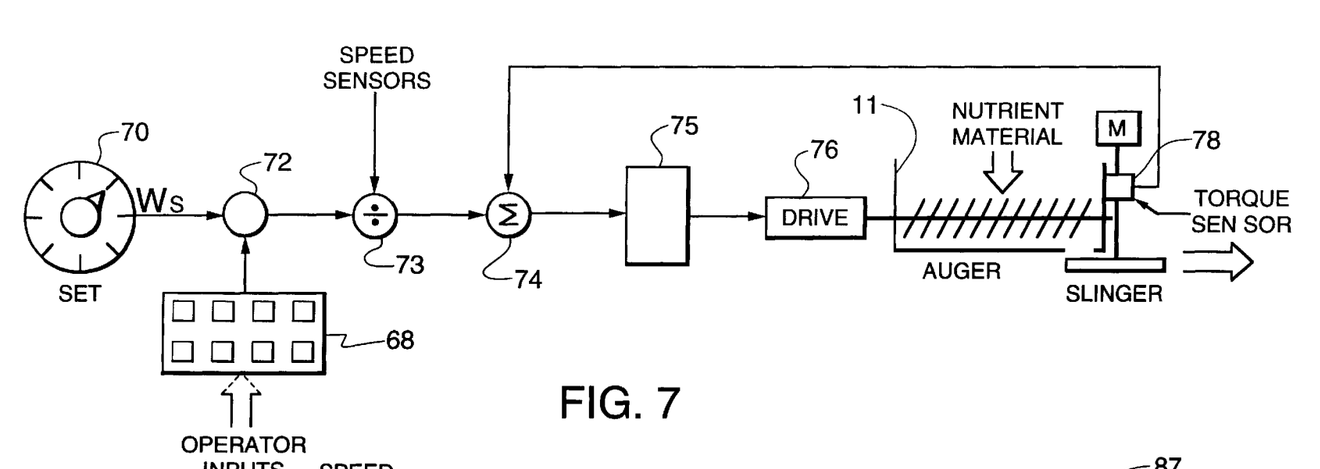
FIG. 7 is a schematic diagram functionally illustrating the algorithm carried out by a second embodiment of a spreader control system wherein the slinger drive torque is periodically sampled to determine the rate of application of the material.
Figure 8:
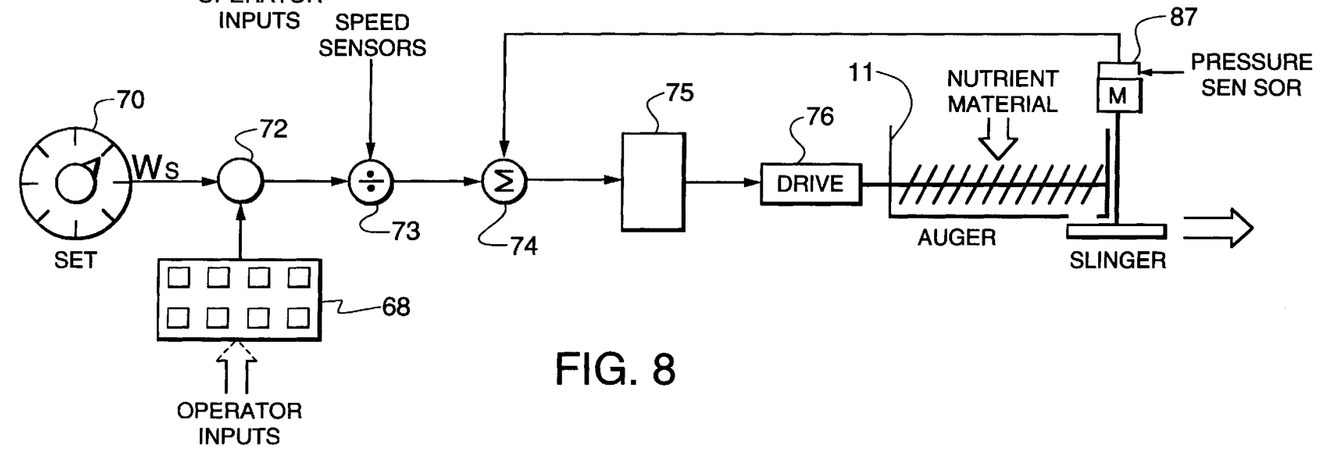
FIG. 8 is a schematic diagram functionally illustrating the algorithm carried out by a third embodiment of a spreader control system wherein the hydraulic pressure of a slinger drive motor is periodically sampled to determine the rate of application of the material; and, FIG. 9 is a schematic diagram functionally illustrating the algorithm carried out by a fourth embodiment of a spreader control system wherein the weight of the nutrient material on a slinger is periodically sampled to determine the rate of application of the material.

In FIGS. 7 and 8, torque sensing is employed to develop the feedback signal since the torque required to rotate the slingers is a direct function of the weight and consistency of the nutrient material on the slingers as it passes from tank 11 onto the slingers which spread it over the field. In FIG. 7, torque sensors 78 (only one shown) such as strain gages are mounted on the slinger drive shafts. In FIG. 8 the torque sensors 87 are pressure sensors which sense the hydraulic drive pressure required to drive the slinger drive motors. In either case the sensors produce a feedback signal which is applied to a comparator 74.

FIGS. 7 and 8 show the signal Ws as being generated from a potentiometer 70 but it may be produced from a memory storing nutrient demand data as described with reference to FIGS. 6 and 6A, or it may be entered by the operator via a keyboard 68. Data regarding material type, density and consistency, and the width Ds over which the material is to be spread is also entered via the keyboard. The keyboard input values are used in a computation circuit 72 to modify Ws according to the consistency, etc. of the material as observed by the operator, and divide Ws by Ds. The resulting value of Ws/Ds, now adjusted for nutrient content, is applied to a divider circuit 73 which receives at its second input the output of a sensor which senses the spreader speed or, more accurately the distance traveled in the interval between periodic samples of the feedback signals as described with reference to FIGS. 4 and 5. The output of divider 73 is a signal representing the desired weight of nutrient material which should be dispersed at the measured speed in order to achieve dispersal of the material at the rate Ws/Ds. This signal is compared, in comparator 74, with the output signal from torque sensors 78 (FIG. 7) or 87 (FIG. 8) to develop an error signal having a value equal to the difference between the signal from divider 73 (the desired weight of material dispersal) and the signal from pressure sensor 78 or 87 (the measured rate). The error signal is utilized in control circuit 75 to adjust the signal to the variable displacement pump 61 (FIG. 4A) which drives the auger drive motor or motors 76. This enables the control system to make on-the-go corrections for changing vehicle speed and variations in material density so as to maintain uniform coverage of nutrient material delivered to the field.

Figure 9:
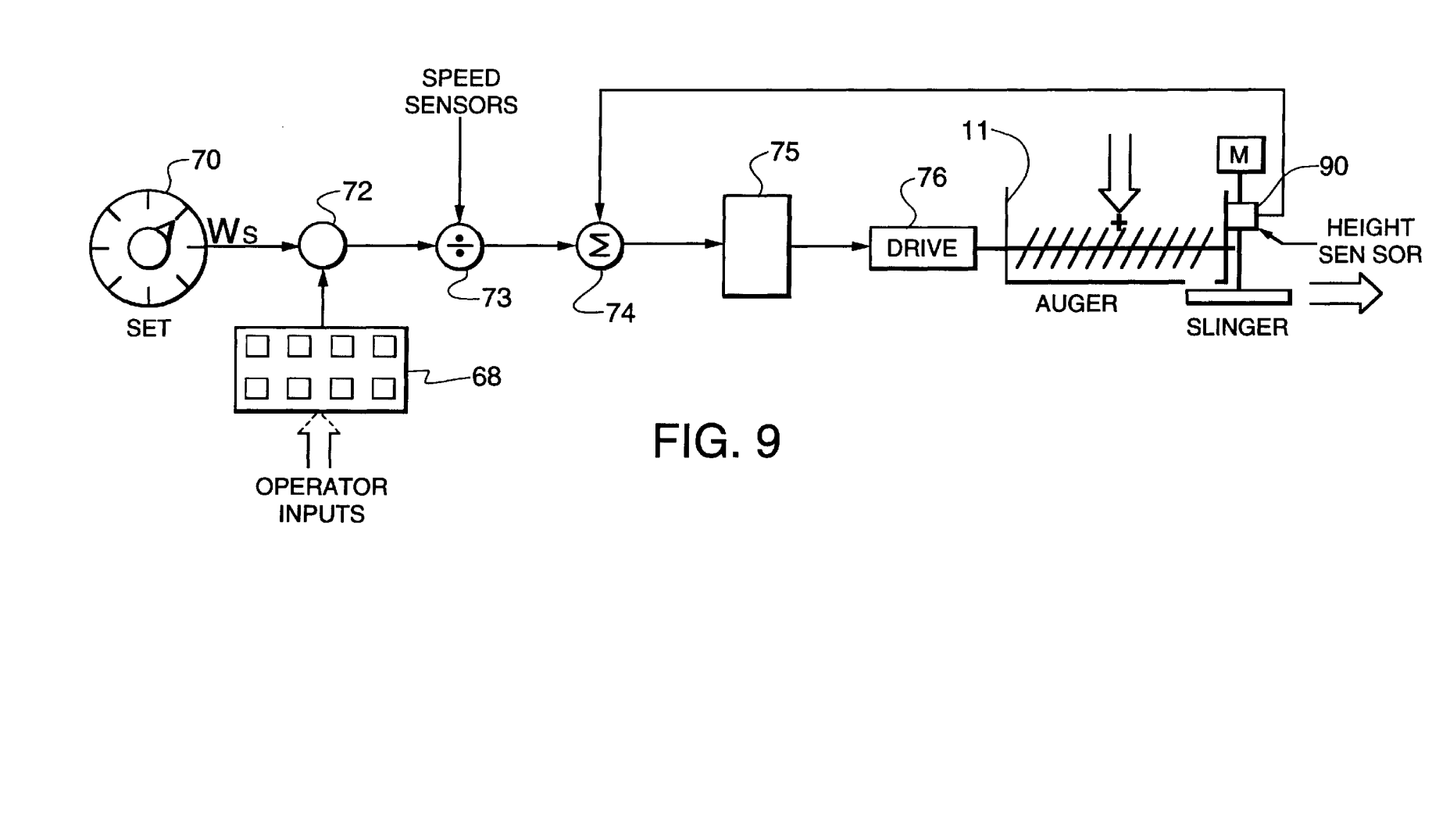

In the system of FIG. 9, uniform nutrient coverage is maintained by sensing the slinger weight. As in the preferred embodiment of FIG. 4, speed sensors are employed to determine forward motion of the spreader, while a weight sensor 90 on the slinger (or slingers, if two are employed) measures the rate of nutrient material delivery to the field. The signal from weight sensor 90 is applied to comparator circuit 74 where it is compared to the desired weight represented by the signal from divider 73. The output of comparator 74 then acts through control circuit 75 to control the speed of auger drive motors 76. This enables the control system to make on-the-go corrections for changing vehicle speed and variations in material density so as to maintain uniform coverage of nutrient material delivered to the field.

While preferred structure in which the principles of the present invention are shown and described in the principal embodiment set forth above, it is to be understood that the invention is not limited to such preferred structure. In fact, widely different means of varying scope and configuration may be employed in the practice of the invention. For example, FIGS. 7, 8 and 9 show abbreviated schematic diagrams, each of which illustrates a different variation in the control system of the preferred embodiments shown in FIGS. 4A and 6A.

Having thus described the invention, what is claimed is:

1. In a nutrient material spreader comprising a main frame supported on ground engaging wheels, a tank mounted on said frame for receiving material to be distributed, a conveyor, a conveyor drive motor for driving the conveyor so that the conveyor conveys material received in said tank to a discharge area, an opening in said tank in the vicinity of said discharge area, and at least one slinger driven by a slinger motor and mounted outside said tank for receiving material discharged through said opening and dispersing the material on a field as the tank is transported over the field, the improvement comprising:

a control system responsive to a nutrient demand signal for controlling the speed of the auger drive motor so that nutrient material is conveyed to said opening at a rate such that a desired weight of nutrient material per unit area of the field, as specified by said nutrient demand signal, is dispersed on the field;

said control system having sensing means producing feedback signals and circuit means for determining, from the feedback signals and said nutrient demand signal, the difference between the desired weight and the actual weight of nutrient material per unit area being dispersed, said circuit means producing an error signal for changing the speed of the auger drive motor to reduce said difference.

2. The improvement as claimed in claim 1 wherein said sensing means comprises first sensor means for sensing the speed of the spreader and second sensor means for sensing the weight of said tank and the material therein.

3. The improvement as claimed in claim 1 wherein said sensing means comprises first sensor means for sensing the speed of the spreader and second sensor means for sensing the weight of nutrient material on said slinger.

4. The improvement as claimed in claim 1 wherein said sensing means comprises first sensor means for sensing the speed of the spreader and second sensor means for sensing the drive torque of said slinger.

5. The improvement as claimed in claim 4 wherein said second sensor means comprises a strain sensor for sensing strain in a shaft which drives said slinger.

6. The improvement as claimed in claim 4 wherein said second sensor means comprises a pressure sensor for sensing the driving pressure of the slinger motor.

7. In a nutrient material spreader comprising a main frame supported on ground engaging wheels, a tank mounted on said frame for receiving material to be distributed, a conveyor assembly including an auger rotatably mounted in said tank for conveying material received in said tank to a discharge area, an opening in said tank in the vicinity of said discharge area, distribution means mounted outside said tank, including means in the vicinity of said opening for receiving material discharged through said opening and distributing it as the tank is transported over a field, the improvement comprising:

a system having control means for dynamically controlling the rate at which material is distributed, said control means provided with a signal based on geographical nutrient demand data enabling site-specific distribution.

8. In a nutrient spreader having a conveyor driven by a motor for conveying nutrient material to a slinger which disperses the nutrient material onto a field, a control system for controlling dispersal of nutrient material onto the field so that an optimum amount of nutrient is spread over each cell of the field, said control system comprising:

a memory for storing a table of nutrient demand data, the table holding therein a nutrient demand value Ws corresponding to each cell of the field and defining an optimum weight of nutrient material to be spread per unit area of the corresponding cell;

a global position receiver mounted on the spreader for determining which cell the spreader is currently located in, said memory being responsive to said receiver for reading out the value of Ws for the cell in which the spreader is located; and, means responsive to a value Ws read from said memory for controlling the speed of said motor.

9. A control system as claimed in claim 8 and further comprising means for modifying each value Ws read from said memory to adjust it for nutrient value before it controls the speed of said motor.

10. A control system as claimed in claim 8 wherein said memory holds a plurality of tables, one for each type of nutrient which might be spread, and means for operator selection of one of said tables before spreading begins.

11. In a manure spreader having a main frame supported for transport on ground engaging wheels, a tank mounted on said frame for receiving manure to be distributed, a conveyor assembly mounted in said tank and driven by a motor for conveying manure received in said tank to a discharge area, an opening in said tank in the vicinity of said discharge area, distribution means mounted outside said tank in the vicinity of said opening for receiving manure discharged through said opening and distributing it as the tank is transported over a field at variable speed, the improvement comprising:

a closed loop control system for dynamically controlling to a variable set point the rate at which manure is distributed, said closed loop control system comprising means for producing a feedback signal representing the average weight of material distributed per unit of distance traveled, and a comparator for comparing said signal to said set point to produce a control signal for controlling the speed of said motor.

12. The improvement as claimed in claim 11 wherein said distribution means comprises at least one slinger mounted for rotation about a vertical axis and driven by a variable speed motor so as to spread manure thereon over a variable width path, and means for selecting a width of said path.

13. The improvement as claimed in claim 11 and further comprising a source of nutrient data indicating the nutrient needs of different cells of said field, and means for deriving said set point from said source of nutrient data, said closed loop control system comprising a microprocessor having means for dividing the nutrient data by a value representing said selected width of said path.

14. The improvement as claimed in claim 13 wherein said nutrient data is stored in a memory associated wish said microprocessor.

15. The improvement as claimed in claim 13 and further comprising a GPS receiver for determining what cell of said field the spreader is located in.

16. The improvement as claimed in claim 15 wherein said nutrient data is stored in a memory associated with said microprocessor and addressed by the cell location determined by said GPS receiver.

17. The improvement as claimed in claim 11 wherein said means for producing a feedback signal comprises a speed sensor for sensing the ground speed of said spreader, weight sensing means for sensing the weight of said tank and the manure therein, and a controller including means for sampling said speed sensor and said weight sensing means to produce said feedback signal.

18. The improvement as claimed in claim 17 wherein said controller comprises a microprocessor having means for periodically sampling said weight sensing means and determining the weight of manure distributed in a time interval between periodic samplings.

19. The improvement as claimed in claim 11 wherein said distribution means comprises at least one slinger driven by a slinger motor to rotate about a vertical axis, and wherein said means for producing a feedback signal comprises a speed sensor for sensing the ground speed of said spreader, weight sensing means for sensing the weight of manure on said at least one slinger, and a controller including means for periodically sampling said speed sensor and said weight sensing means and producing said feedback signal.

20. The improvement as claimed in claim 11 wherein said distribution means comprises at least one slinger mounted on a vertical shaft driven by a slinger motor, and wherein said means for producing a feedback signal comprises a speed sensor for sensing the ground speed of said spreader, a torque sensor for sensing the torque required to drive said at least one slinger, and a controller including means for periodically sampling said speed sensor and said torque sensor and producing said feedback signal.

21. The improvement as claimed in claim 20 wherein said torque sensor comprises a strain sensor for sensing strain in said shaft.

22. The improvement as claimed in claim 20 wherein said torque sensor comprises a pressure sensor for sensing the driving pressure of said slinger motor.

23. The improvement as claimed in claim 11 wherein said distribution means comprises at least one slinger driven by an hydraulic slinger motor to rotate about a vertical axis, and wherein said means for producing a feedback signal comprises a speed sensor for sensing the ground speed of said spreader, a pressure sensor for sensing the pressure required to drive said at least one slinger, and a controller including means for periodically sampling said speed sensor and said pressure sensor and producing said feedback signal.

24. The improvement as claimed in claim 11 and further comprising a manually operable control for varying said set point.

* * * * *